United States Patent [19]
Cardero et al.

[11] Patent Number: 5,101,395
[45] Date of Patent: Mar. 31, 1992

[54] DATA DETECTION EMPLOYING HIGH-SPEED BASELINE TRACKING COMPENSATION

[75] Inventors: Silvio A. Cardero; Brian G. Goodman; Julian Lewkowicz, all of Tucson, Ariz.

[73] Assignee: International Business Machines Corporation, Armonk, N.Y.

[21] Appl. No.: 535,697

[22] Filed: Jun. 11, 1990

[51] Int. Cl.[5] .............................................. G11B 5/09
[52] U.S. Cl. .......................................... 369/59; 360/46
[58] Field of Search ...................... 369/59; 360/46, 40, 360/45

[56] References Cited

U.S. PATENT DOCUMENTS

| | | | |
|---|---|---|---|
| 3,719,934 | 9/1970 | Behr et al. | 340/174.1 H |
| 4,323,885 | 4/1982 | Carriere et al. | 340/347 |
| 4,418,406 | 11/1983 | Ogawa | 369/124 |
| 4,445,111 | 4/1984 | Swift et al. | 340/347 CC |
| 4,475,183 | 10/1984 | Marchant et al. | 369/59 |
| 4,646,281 | 2/1987 | Verboom | 369/59 |

Primary Examiner—Vincent P. Canney
Attorney, Agent, or Firm—H. F. Somermeyer

[57] ABSTRACT

A data detection circuit employing either amplitude or transition location techniques to adjust a detection threshold for following shifts in baseline of the signal being detected. In the amplitude version, the midway amplitude value between a detected succession of positive and negative peaks adjusts the detection threshold such that threshold adjustment occurs in one detection period and is used in the immediately-following detection period. In the transition-position detection, the relative location in time of successive transitions, represented by samples of the transition of a read signal, are integrated and averaged for providing detection which tracks baseline shifts. In all cases, shifting of detection threshold is always immediately adjacent the usage of a detection threshold which continually follows a shifting DC baseline of the input signal. A tracking detection threshold follows baseline shift of a distorted read signal detects zero axis crossing of the analog signal for generating a NRZI digital waveform.

6 Claims, 4 Drawing Sheets

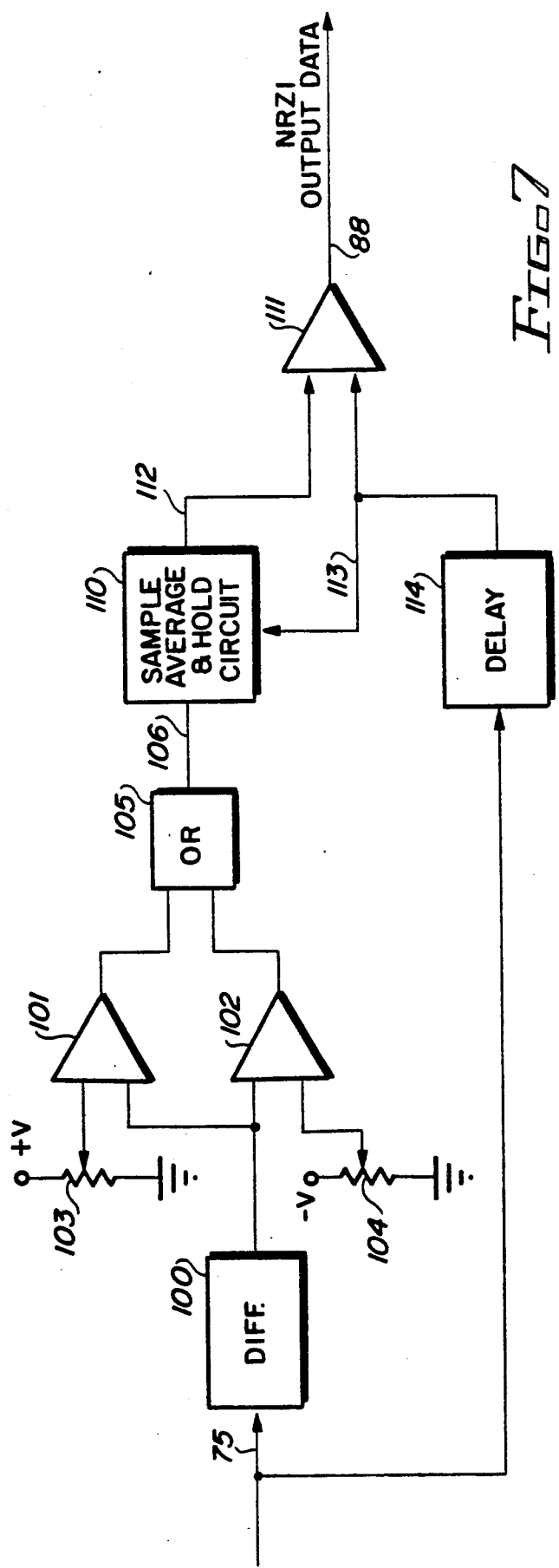
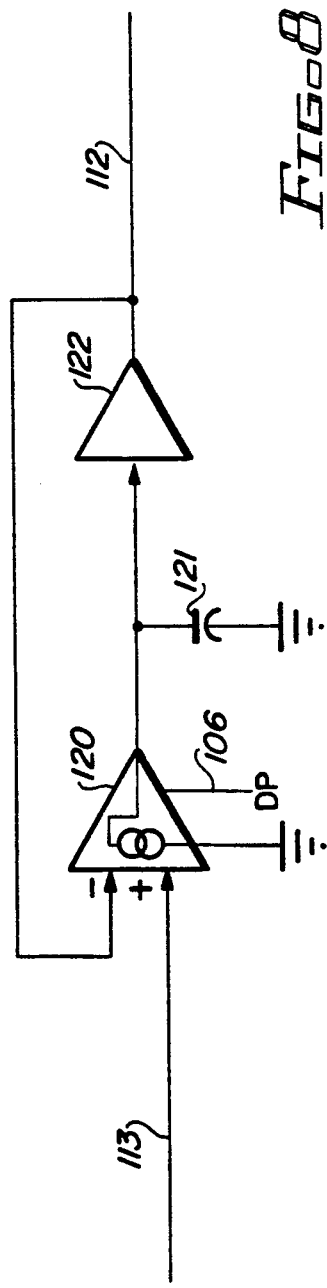
Fig. 7
Fig. 8

DATA DETECTION EMPLOYING HIGH-SPEED BASELINE TRACKING COMPENSATION

FIELD OF THE INVENTION

The present invention relates to data detectors, particularly those detectors usable with pulse-width modulation (PWM), and for use with optical disk recorders.

BACKGROUND OF THE INVENTION

Digital or digitized signal processing has always been sensitive to signal baseline shifts whenever a digital or bipolar signal was unbalanced toward one polarity or the other, the shift toward the dominant polarity brings the baseline toward that polarity.

Digital waveforms (also known as binary signals), such as the NRZI pattern 16 shown in FIG. 1, have no baseline shift, which means that are only two levels in that waveform. The waveform has a high level denoted HI, a low level denoted LO and transitions between two levels denoted T. Idealized reproduction of a digital waveform requires a noiseless and infinite bandwidth linear analog channel.

When a digital waveform passes through an analog channel, such as a magnetic tape write/read channel or an optical disk write/read channel, it experiences distortions.

Distortions are caused mainly by limited bandwidth of the channel and the addition of noise. High frequency limits or high frequency roll-offs of the channel cause high frequency (or short wavelength) signals to have less amplitude than low frequency (or long wavelength) signals. Waveform or signal 18 illustrates high frequency roll-off distortions. AC coupling employed in channels to avoid DC shifts and drifts between different stages of signal processing circuits causes removal of the DC component of the signal and hence baseline shift. A baseline is an imaginary line connecting average points between two adjacent opposite peaks of an analog waveform. Baseline shift is illustrated by numeral 19. Depending on wavelength and digital sequence, both high frequency roll-off and AC coupling cause analog signals to shift the baseline. Additional causes of the base line movement of a read back signal in an optical disk channel are changes in media reflectivity and birefringence of the optical disk substrate. Because of the above reasons, the peaks and transitions in analog waveforms occur at different, often unpredictable, levels and are difficult to reliably detect by conventional fixed threshold detectors.

In data detectors, baseline shift can cause an apparent shift in transition positions (zero axis- crossing shifts with baseline shifts). One way to accommodate or prevent some of the baseline shifts is to provide balanced codes; i.e., the amount of signal in one polarity is equal to the same amount of signal in the opposite polarity, such that the net DC component of the signal is zero. This increases the overhead of the recorded data, therefore, it is desirable to provide a data detection system which rapidly compensates for any DC shift in signal baseline.

The simplest way to detect analog data transitions, which are carrying digital information, for example, is to compare the amplitude of the analog waveform with a fixed amplitude threshold. In such detection, each time the analog signal amplitude crosses the threshold, a transition is indicated. The slope of the analog transition; i.e., at the zero axis crossing, depends on many factors, including the read-channel bandwidth and its characteristics. Generally, the lower the bandwidth, the lower the slope. The lower the slope, the more difficult it is to obtain a precise location of the zero axis crossing, as is necessary in detecting pulse-width modulated signals. Also, it is well known that the analog-signal baseline (DC level) is constantly moving. The real crossing point between the transition and the fixed threshold will shift causing data detection errors. If the analog-signal moves entirely above or below the fixed threshold, the transition detection fails. The optical disk baseline movements of a readback signal, which is turned to analog signal, shifts toward either polarity and dynamically changes because of the often-used alternating current (AC) coupling, changes in media reflectivity and by birefringence of the substrate through which a reading or sensing laser beam passes to reach the recording layer of the optical medium.

DISCUSSION OF THE PRIOR ART

Because of the above-described baseline shifting, a common transition detection method is to differentiate the received analog signal and then peak detect the differentiated signal. The differentiated signal is often redifferentiated in order to obtain a zero axis crossing, which is in time-coincidence with each peak in the differentiated signal. By detecting those zero axis crossings, binary one's are detected. A problem with differentiation detection is the increase in noise associated with the differentiating process. The differentiating, of course, increases the high-frequency response in the read channel and boosts high frequency noise. Theoretically, a reduction in the signal-to-noise ratio is about six decibels. It is desired to avoid this problem and yet decrease sensitivity to baseline by accommodating this detection process to the baseline shifting.

Differentiation of a read signal is also used to time the detection; that is, the zero crossing of the differentiated signal is time coincident with the peak of the read signal. U.S. Pat. No. 4,475,183 by Marchant et al., shows such a system. This system is also subject to phase shifting of the transition position in the detection process, which is to be avoided.

Ogawa in U.S. Pat. No. 4,418,406 shows a signal-wave control circuit having a comparator for receiving an input signal and a second input to the comparator for receiving a reference level signal. An output terminal carries the output signal having positive and negative portions corresponding to the input signal. A detector detects the maximum or minimum transition interval included in the output signal for producing a detected signal. A hold circuit holds the detected signal and a control circuit produces the reference level signal whereby the interval of the positive portion of the output signal and the interval of the negative portion of the output signal become equal. The circuit then is a system for removing the effects of DC-baseline shifts in analog signals. This circuit requires a balanced run length limited code system which, as discussed above, increases the recording overhead of the recorded data; therefore, a more flexible baseline accommodation system is desired than that shown by Ogawa.

SUMMARY OF THE INVENTION

It is an object of the present invention to provide enhanced DC-baseline compensation.

It is another object to provide a transition detection which overcomes baseline shifting in an input signal waveform, and detects the transition without a penalty of adding noise.

A baseline tracking-threshold detector, in accordance with the invention, tracks the baseline movement of the input data signal. The baseline shifting is extracted from the readback or input signal, and a tracking threshold is developed by sampling the input signal to be detected and adjusting the detection threshold as the baseline shifts at data detection time.

In one aspect of the invention, the baseline position at one detection, or sample time, holds the value of the DC-baseline detection threshold until the next sample time. Sampling of the input data signal preferred to be achieved by detecting the peaks of the input analog signal or inflection points of the transition.

In some embodiments of the invention, positive and negative peak detectors define the peak envelope of the readback or analog signal to be detected. Peak values are averaged to find the detection threshold. The tracking baseline is then used as a reference for detecting transitions at defined sample times.

In another embodiment of the invention, the baseline value is averaged between successive transition position areas using the above-mentioned peak value averaging. In a specific form of the invention, the signal to be detected is delayed by one detection period. During this one period delay, the DC-baseline tracking occurs. On the end of the delay, the tracking threshold for the signal which was delayed, provides accurate amplitude detection of the data in the received and delayed signals.

The foregoing and other objects, features, and advantages of the invention will be apparent from the following more particular description of preferred embodiments of the invention, as illustrated in the accompanying drawings.

BRIEF DESCRIPTION OF THE DRAWING

FIGS. 5, 6, 7 illustrate, in diagrammatic form, three different detection circuits implementing the present invention.

FIG. 8 is a schematic diagram showing a sample averaging hold circuit usable with FIG. 7-illustrated detector circuit.

DETAILED DESCRIPTION

Figure 1:
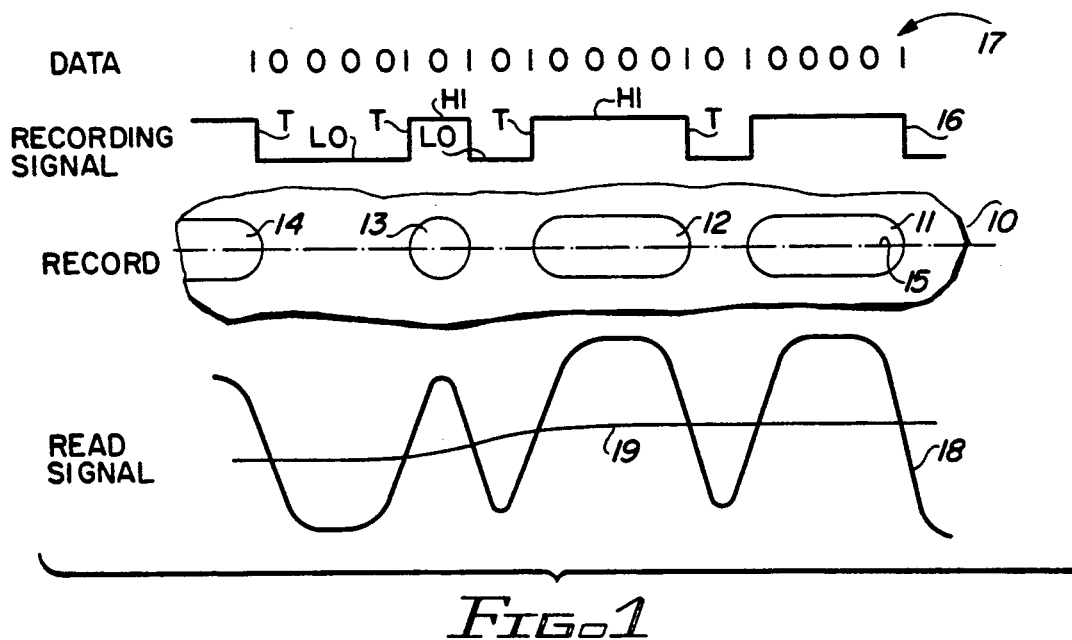
FIG. 1 is a diagrammatic showing of a portion of an optical disk having pulse-width modulated signals recorded thereon and the resultant readback signal.

Referring now more particularly to the drawing, like numerals indicate like parts of structural features in the various figures. Portion 10 of an optical disk shows a track having a track centerline 15 with recorded optically-sensible spots 11, 12, 13 and 14. The spots 11-14 can be either magnetooptically sensed on a magnetooptic medium, intensity-modulation sensed, such as in an ablative medium, or in a phase-changed medium, for example. The recorded spots 11-14 are on a planar surface of portion 10; i.e., no grooves are shown in this particular embodiment, it being understood that either planar or grooved optical medium may be employed. Further, the principles involved may also be used with magnetic recording of some types. The recording signal 16 is used to record the spots 11-14 representing the transition data 17, wherein the binary one represents a transition in a transition position, while a binary zero represents the absence of a transition in a transition position along track 15. It is to be understood that the information recorded in marks 11-14 is derived from the durations of the pulses in the recording signal 16; i.e, the space between successive transitions to provide a pulse-width modulated signal. The principle to the present invention can also be applied to pulse-position modulation, wherein each of the positive peak positions presented by the data 17 indicate unique information, as known, for pulse-position modulation. The sensing of the recorded information on portion 10 results in a read signal 18. Because of the imbalance in the recorded waveform; i.e., the two successive long one-half wavelengths, represented by spots 11 and 12, shifts the readback signal DC baseline 19. According to the present invention, the shifting of the DC baseline 19 is accommodated at each of the transition positions represented by binary one in data 17.

Figure 2:
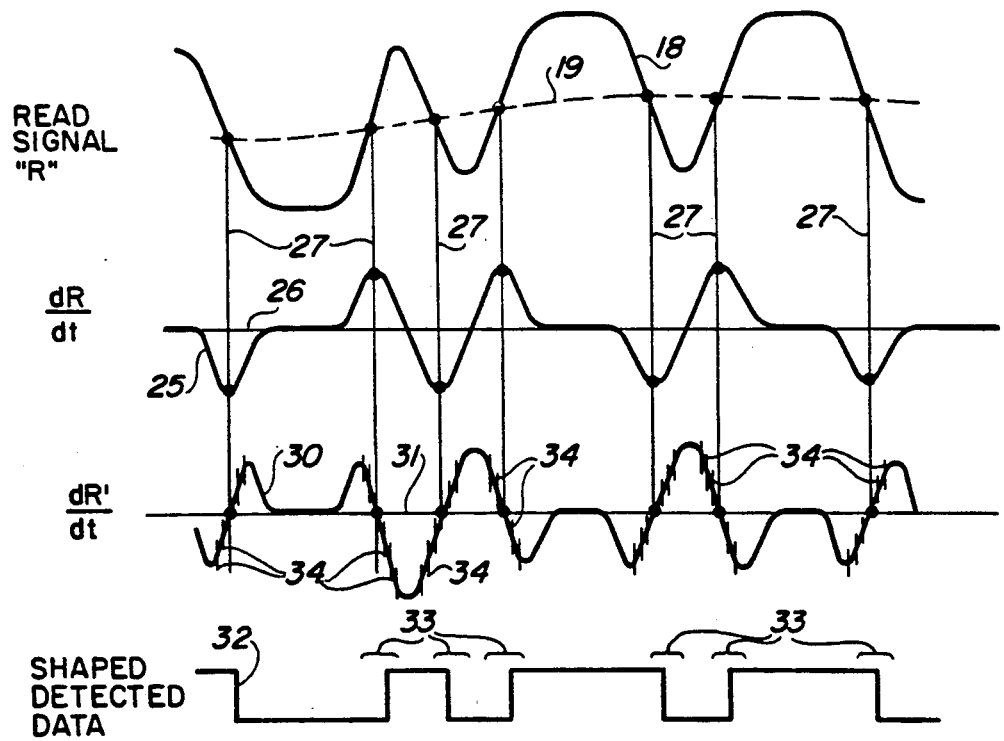
FIG. 2 illustrates the prior art detection system using differentiated signals.

FIG. 2 illustrates a prior art technique for amplitude-detecting a readback signal 18, even with a shifted DC baseline 19. It is to be understood that noise is introduced into the readback channel and the possibility of missing data or getting erroneous data is relatively high. Generally, these systems are designed for low density recording respectively. Noise caused by high frequency boost can introduce errors in the data detection process. This shifting is often referred to as jitter such as represented by brackets 33 which indicate ranges of unintended transition position changes caused by noise represented by hash marks 34 on signal 30. In accordance with one aspect of the prior art, the read signal, R, is differentiated (dR/dt) to reproduce a differentiated signal 25 having a constant baseline 26. The differentiated signal 25 is again differentiated to obtain signal 30 (dR'/dt) having a baseline 31. The zero axis crossings of signal 30 are used to time the detection of the peaks in signal 25 for producing a shape-detected data output signal 32. The false zero crossings of signal 30 have to be eliminated, such as by sensing the low-amplitude portion of signal 25.

Figure 3:
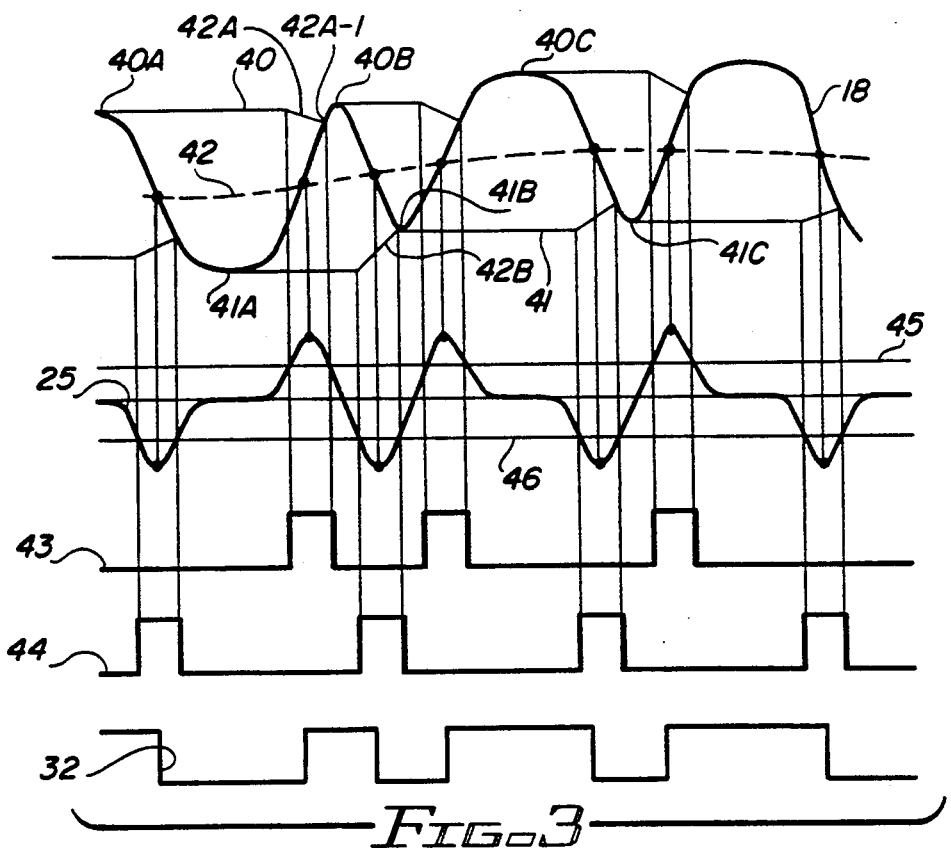
FIG. 3 is a graph showing a plurality of signals used to show the operation of the present invention.

FIG. 3 shows a set of signal waveforms illustrating a principle of deriving a detection-tracking amplitude threshold from amplitude samples, such as, peak amplitudes of the readback signal 18. Effectively, the detection process produces a positive signal envelope 40 and a negative signal envelope 41, each envelope is related to the respective positive and negative peak amplitude values of readback signal 18. Detection threshold 42 tracks the DC imbalance shifting of baseline 19 by averaging the values of envelope signals 40 and 41, which shift with the DC baseline. Additionally, read signal 18 is differentiated to produce differentiated signal 25. The zero axis or baseline crossing of read signal 18 are timed coincident with the peak amplitudes differentiated signal 25. When the peak amplitudes of differentiated signal 25, which is a positive-peak exceeding threshold 45, and a negative-peak exceeding threshold 46, output pulses 43 and 44 are generated. These pulses gate current sources 67 and 83 during positive and negative pulse durations of the differentiated signal 25 for discharging the storage capacitors 69 and 84, respectively. These capacitors respectively store the positive and negative signal peak values received from detectors 65 and 80, respectively. Each capacitor discharge occurs immediately before the next ensuing peak is to be detected. This discharge enables tracking lower peak values (more faithfully indicate amplitudes of small amplitude signal peaks); otherwise the storage capacitors 69 and 84 could continue to store a prior higher amplitude peak value. The detected NRZI signal 32 is generated by detecting signal 18 crossing baseline 42.

The value of the DC baseline or detection-tracking baseline 42 is held between the zero axis crossings of read signal 18. At each zero axis crossing of read signal 18, the baseline is again measured and the detection threshold adjusted. This amplitude derived DC baseline 42, therefore, rapidly tracks read signal 18 baseline shifting since there is a full adjustment at each of the zero axis crossings of read signal 18. This adjustment occurs twice for each full cycle of read signal 18. For example, in FIG. 3, the first baseline adjustment curves at 42A of the comparison at the peak amplitudes of read signals 41B and 40B. The second adjustment, at 42B, shows an upward shift, as viewed in FIG. 3 of the detection-threshold tracking level 42. This adjustment is caused by measuring the amplitude difference between peaks 40B and 41B. The adjustment at 42A-1, which is minor, is achieved by positive peak detector 65 acquiring positive peak 40B. This adjustment procedure is repeated throughout the signal processing of readback signal 18. Negative peaks 41A, 41B and 41C are tracked in this manner by the negative peak detector 80.

In accordance with the invention, zero axis crossings of read signal 18, and a detection threshold which tracks the baseline 42, can be generated by averaging the peaks 40 and 41. Averaging circuit consists of positive envelope buffer 68, resistor 72, negative envelope buffer 81, resistor 85 and averaging capacitor 73.

Figure 4:
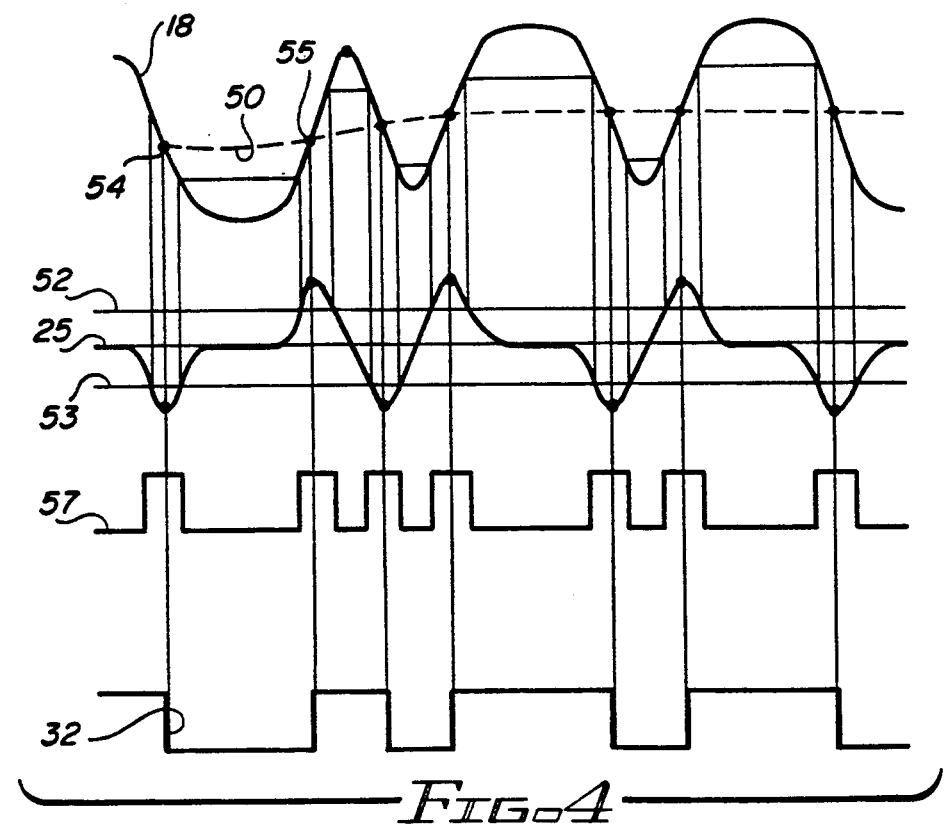
FIG. 4 is a modified detection procedure in accordance with the invention.
Figure 6:
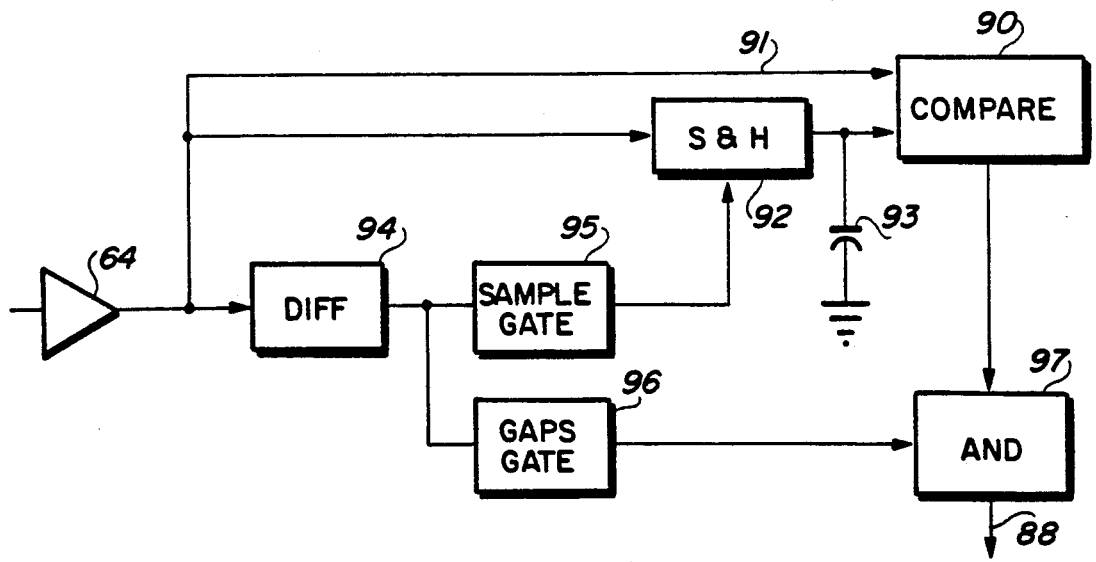

In a first embodiment, the transition immediately following the baseline measurement is used. In a second embodiment, the transition intermediate to adjacent peak amplitudes used to generate a corrected baseline-detection threshold is used. It should be noted that the detection of the data and the adjustment of the baseline is highly dynamic, such that the detection threshold 42, or adjusted baseline, quickly follows the shifts and amplitude values of the readback signal. FIG. 4 shows a set of signal waveforms usable to describe FIG. 6, wherein the tracking threshold follows the shifting baseline based upon transition sampling. This system is just as dynamic as that described for FIG. 3, and currently is a preferred embodiment of the invention. In this system, readback signal 18 is analyzed to produce a tracking threshold 50, which shifts with baseline shifting. A set of amplitude thresholds 52 and 53 provide for peak detection of differentiated signal 25 to identify the zero axis crossings of read signal 18. These values are adjusted at each zero axis crossing of readback signal 18. Numerals 54 and 55, respectively, represent samples of falling and rising transitions in signal 18 which are sampled and averaged to derive the detection threshold. After sampling and averaging the respective denture, it is stored by a sample and hold circuit, later described, which holds the level of the derived tracking threshold 50. Signal 57 is a unipolar set of signals corresponding to the sampling aperture of positive and negative transitions of differentiated signal 25. The NRZI readback data signal 32 is generated by detecting signal 18 crossing the threshold 50. FIGS. 6 and 7 illustrate a detection circuit which uses the FIG. 4 technique of data detection which has dynamic baseline shift accommodation.

Figure 5:
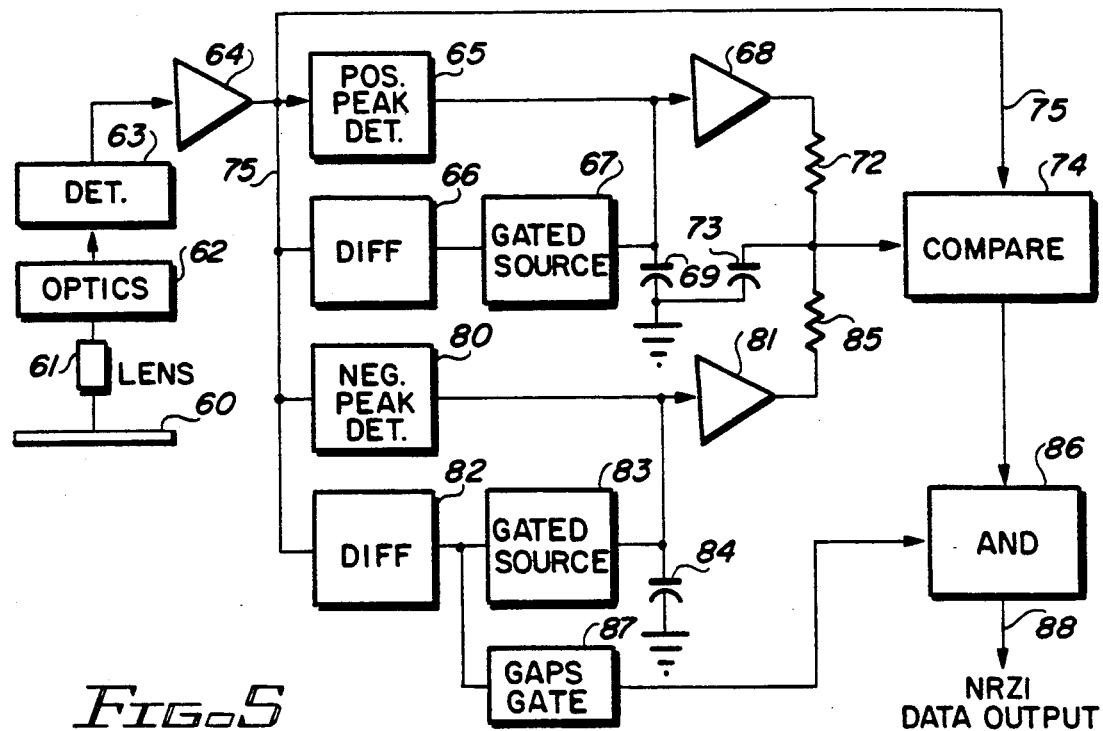

Referring next to FIG. 5, an optical disk 60, which portion 10 is a part of, is sensed in the usual manner using a laser (not shown) with focusable and movable lens 61 and optics 62. Relative focusing and positioning of optic lens 61 with respect to optical disk 60 is well known and not described for that reason. Optics 62 can either be those optics used for magnetooptic signal detection, phase-change signal detection, and the like. A read signal detector 63 suitable for all the recording systems detects the recorded data and supplies signal 18 to read amplifier 64 which supplies an amplified version to the illustrated detection circuits.

The positive envelope signal 40 is generated by the circuits including the positive peak detector 65, which supplies its positive-peak detected signal to operational amplifier 68. Capacitor 69 holds the detected peak value until the next transition is detected. When the next transition is detected, differentiator 66 generates signal 25 from readback signal 18, and supplies it to gated current source 67. When the signal 25 exceeds the positive threshold 45, gated current source 67 responds to the positive peak of differentiated signal 25 to rapidly discharge capacitor 69. After the storage capacitor 69 is partially discharged, the positive peak detector 65 charges capacitor 69 rapidly to the new peak value, such as at 40B of FIG. 3. That sensed value is then held until the next positive zero axis crossing occurs. Operational amplifier 68 supplies the sampled and held values stored in capacitor 69 to a resistive averaging circuit, including resistors 72 and 85, and smoothing capacitor 73. The value held by smoothing capacitor 73 is the average value representing the detection tracking signal 42.

The negative peak envelope 41 is generated by the circuits, including negative peak detector 80, which supplies its value to operational amplifier 81 and storage capacitor 84. Capacitor 84 holds the value of the negative peak to the input of operational amplifier 81 in same manner as described for the positive peaks, but until the next negative transition of read signal 18 is detected. That is, the signal is held until signal 25 has a negative peak amplitude lower than the amplitude threshold 46. Again, differentiator 82 differentiates signal 18 and supplies the differentiated signal to gated current source 83. Gated current source 83 responds to the signal 25 exceeding the negative threshold 46 to rapidly discharge the capacitor 84. After the storage capacitor 84 is partially discharged, negative peak detector 80 quickly charges capacitor 84 for reestablishing the negative envelope value 41 at the just-detected negative peak value of read signal 18. Operational amplifier 81 supplies the signal 41 through resistor 85 to capacitor 73. Resistors 72 and 85 have an equal impedance and, therefore, find a median value between the two successively-detected positive and negative peaks for generating signal 42.

The data detection is achieved by three elements of FIG. 5. Compare circuit receives signal 18 over line 75 for comparison with signal 42. The NRZI signal from this comparison is supplied to analog circuit AND 86, which is actuated to produce a train of pulses on line 88, representing the NRZI data output, which is shown in FIG. 3 as signal 32. Gaps gate 87 enables AND 86 only when data signals are being sensed, to pass digital signal 32 from comparator 74 to line 88. Positive and negative peaks of the signal 25, respectively, exceeding the positive and negative thresholds 45 and 46 generate the pulses 43 and 44. Pulses 43 and 44 are used to develop a gap gating function 87. Gaps gate 87 responds to the signal 25 supplied by differentiator 82 to indicate when a true data signal is being received. Many recordings have gaps or areas of no signal between recorded blocks of signals. Gap gate 87 detects such gaps and signal blocks in a known manner, such as by envelope detection, by integration, and the like. Gap gate 87 gates detected signal 32 out of comparator through AND gate 86.

FIG. 6 illustrates a circuit for implementing the transition-position detection aspect of the invention. Operational amplifier 64 supplies the amplified readback signal 18 over line 91 to compare circuit 90. Readback signal 18 is also supplied to sample and hold circuit S & H 92, which is triggered to sample the signal as described for FIG. 4. In this regard, differentiator 94 creates signal 25, which is compared with the amplitude thresholds 52 and 53 to activate sample gate 95 for both the positive and negative amplitude excursions of signal 25 beyond the thresholds 52 and 53. Two successive integrations of the sample and held amplitudes 54 and 55 are supplied into integration capacitor 93 to supply the signal 50 to compare circuit 90. Note that the signal integration, in capacitor 93, is a time-amplitude integration to provide an indication of the transitions. Capacitor 93 is sufficiently large that detection threshold 50 shifts less dynamically than threshold 42. Results of the comparison 90, between the read signal 18 and the threshold 50, results in NRZI pulses 32.

FIG. 7 shows a circuit which detects zero axis crossings of signal 18. Line 75 carries the operational amplifier 64 signal to differentiator 100 which generates signal 25 (FIG. 4). Signal 25 goes to a pair of peak-amplitude comparison detectors 101 and 102. Comparator 101 has a reference value supplied by potentiometer 103 and generates a voltage threshold 52. Comparator 101, supplying a constant amplitude signal to OR gate 105 to be sampled, held and averaged in circuit 110. Similarly, for the negative excursion of differentiated signal 25, potentiometer 104 supplies voltage threshold 53, which is supplied to the reference input of switching comparator 102. Whenever signal 25 exceeds threshold 53, a gate signal is supplied to OR circuit 105 to be passed to sample average and hold circuit 110. It should be noted that these gating pulses are of the same duration and same amplitude; therefore, these signals are representative of the readback transition positions, as opposed to the peak amplitudes used with the FIG. 5-illustrated embodiment.

FIG. 8 illustrates a preferred construction of the sample average and hold circuit, a known arrangement. The line 113 signal is supplied as one input to the switching amplifier 120. The peak indicating signal on line 106, supplied by OR circuit 105, turns on charge pump 120 on to sample the amplitude of the signal 18 and compare it with the current value of the detection-threshold signal 50 on line 112. The amplitude difference detected by circuit 120 between the input value and the current reference value adjusts the stored voltage in capacitor 121 during the duration of the peak indicating pulses (57). Stored values continue to be supplied to operational amplifier 122, which supplies the tracking detection threshold signal 50 on line 112. The FIG. 8 illustrated circuits may replace S & H 92 and capacitor 93 of FIG. 6.

While the invention has been particularly shown and described with reference to preferred embodiments thereof, it will be understood by those skilled in the art that various changes in form and details may be made therein without departing from the spirit and scope of the invention.

What is claimed is:

1. An apparatus for detecting digital data signals, including in combination:
    means for receiving a data signal carrying digital information to be detected;
    means for differentiating the received data signal to supply a differentiated signal;
    peak circuit means receiving the differentiated signal and detecting the positive and negative peaks thereof to produce a sampling aperture, which coincides with transitions in received data signal for each detected peak;
    sample and hold circuit means connected to the receiving means to receive said received data signal and connected to the peak circuit means for responding to each sampling aperture signal to sample and store the then-current value of the delayed received data signal as a baseline indicating value; and
    detection circuit means connected to the sample and hold circuit means to detect the value of the data indicated by the received data signal using said baseline indicating value for a next-occurring transition-indicating zero axis crossing of the received data signal.

2. In the apparatus set forth in claim 1, further including, in combination:
    said sample and hold circuit means including averaging means for averaging values of successive unlike-polarity transition samples.

3. In the machine-effected method of detecting a data signal including the machine-executed steps of:
    detecting the level shift of a DC baseline of said data signal and setting a detection threshold which shifts with said baseline;
    amplitude detecting the data signal using said detection threshold for a next succeeding data transition in said data signal;
    detecting said baseline level shift by measuring a one of the peak amplitudes of said data signal and then measuring a next one of the peak amplitudes of said data signal having a signal polarity opposite to the first-mentioned one peak amplitude;
    creating said detection threshold by averaging the two values of said measured peak amplitudes;
    differentiating said data signal; and
    detecting said baseline level shift by peak detecting the differentiated signal only when the differentiated signal peak amplitudes exceed predetermined positive and negative amplitude thresholds.

4. In apparatus for detecting transitions in a data signal having detection periods in which data is detectable and having a peak amplitude in each of said detection periods, including, in combination:
    first means for analyzing a signal envelope of the data signal in each detection period of the signal and establishing an amplitude detection threshold having a predetermined amplitude relationship to said analyzed signal envelope for a next ensuring detection period;
    second means for amplitude comparing said data signal and said amplitude detection threshold in a next-occurring detection period of the data signal; and said first means including peak detecting means for detecting the amplitudes of two opposite peaks, averaging means connected to the peak detecting means for averaging the detected peak amplitude and supplying said average as said amplitude detection threshold.

5. In the apparatus set forth in claim 4, further including, in combination:

said first means having differentiating means for differentiating said data signal, said peak detection means being coupled to said differentiating means for peak detecting the amplitudes of two peaks of said differentiated data signals.

6. In apparatus for detecting transitions in a data signal having detection periods in which data is detectable, including, in combination:

first means for analyzing a signal envelope of the data signal in each detection period of the signal and establishing an amplitude detection threshold having a predetermined amplitude relationship to said analyzed signal envelope for a next ensuing detection period; and second means for amplitude comparing said data signal and said amplitude detection threshold in a next-occurring detection period of the data signal; and gating means connected to said second means for receiving said detected data signal; and gap means receiving said data signal for indicating when a true data signal is being received and actuating said gating means to pass the detected data signal only when said true data signal is indicated.

* * * * *